United States Patent [19]
Ebner et al.

[11] Patent Number: 5,657,025
[45] Date of Patent: Aug. 12, 1997

[54] INTEGRATED GPS/INERTIAL NAVIGATION APPARATUS PROVIDING IMPROVED HEADING ESTIMATES

[75] Inventors: Robert E. Ebner, Auburn, Calif.; Ronald A. Brown, Seminole, Fla.

[73] Assignee: Litton Systems, Inc., Woodland Hills, Calif.

[21] Appl. No.: 511,965

[22] Filed: Aug. 7, 1995

[51] Int. Cl.⁶ .................................. G01S 5/02; G01C 21/00
[52] U.S. Cl. ........................ 342/357; 342/442; 364/453
[58] Field of Search ................................ 342/357, 394, 342/442; 364/453

[56] References Cited

U.S. PATENT DOCUMENTS

| | | | |
|---|---|---|---|
| 4,809,005 | 2/1989 | Counselman, III | 342/352 |
| 5,075,695 | 12/1991 | McMillan et al. | 342/457 |
| 5,268,695 | 12/1993 | Dentinger et al. | 342/357 |
| 5,347,286 | 9/1994 | Babitch | 342/359 |

*Primary Examiner*—Gregory C. Issing
*Attorney, Agent, or Firm*—Robert E. Malm

[57] ABSTRACT

The integrated GPS/inertial navigation apparatus utilizes satellite signals received with two spatially-separated antennas to achieve improved heading estimates for a mobile platform. Each satellite signal comprises one or more component signals with each component signal having a different carrier frequency. The integrated GPS/inertial navigation apparatus consists of a receiver and an inertial navigation system. The receiver measures the carrier phase of each of one or more component signals of one or more satellite signals received by each of the two antennas during successive time periods of duration $T_p$. Phase measured during a $T_p$ time period is called $T_p$-phase. Only one component signal of one satellite signal received by one antenna is measured during any $T_p$ time period. The receiver utilizes the $T_p$-phases of each component signal obtained during a $T_k$ time period to estimate the phase of the component signal at the end of the $T_k$ time period, the estimated phase at the end of the $T_k$ time period being called the $T_k$-phase. The inertial navigation system, comprising inertial sensors and a digital processor, utilizes the $T_k$-phases in determining the heading of the vehicle and the displacement of each of the two antennas from the inertial sensors of the inertial navigation system. The measured phase of a component signal is subject to error as a result of the satellite signal traversing the ionosphere. The inertial navigation system achieves more accurate estimates of heading and antenna displacements by utilizing the $T_k$-phases in determining ionospheric corrections to phase.

10 Claims, 1 Drawing Sheet

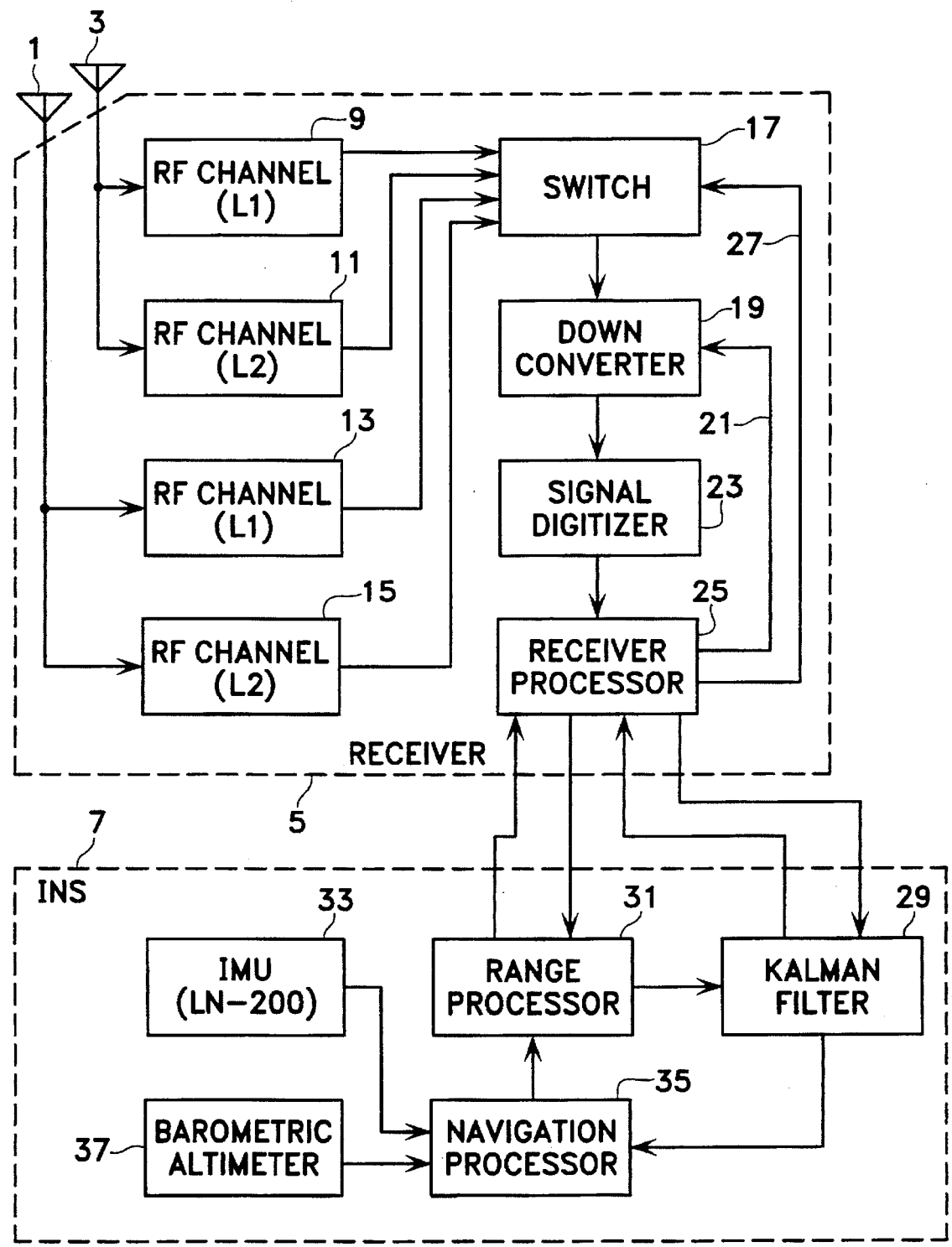

INTEGRATED GPS/INERTIAL NAVIGATION APPARATUS PROVIDING IMPROVED HEADING ESTIMATES

BACKGROUND OF THE INVENTION

This invention relates generally to methods and apparatus for utilizing satellite signals in combination with an inertial navigation system (INS) to determine vehicle heading. More specifically, the invention relates to the use of signals transmitted by a Global Positioning System (GPS) satellite and INSs which utilize gyros with bias errors ranging up to one degree per hour.

Position, velocity, and attitude of a vehicle can be accurately determined using well-known methods of coupling GPS receiver/processors and INSs. Accurately determining the heading of a vehicle under all conditions of motion, however, requires either a long period of time gyrocompassing in the case of medium-accuracy INSs (i.e. gyro bias errors of ~0.01 degrees/hour) or the use of a magnetic detector such as a flux valve in the case of low-accuracy INSs (i.e. gyro bias errors of ~1 degree/hour).

INS measurements of heading can be corrected by utilizing GPS measurements of vehicle position and velocity when vehicle maneuvering is taking place. However, in the case of a low-accuracy INS, errors in heading during periods without turns or accelerations grow as a result of gyro drift—potentially one degree for every hour of non-acceleration—or be limited to about one degree by the errors in the flux valve.

Another approach is to use two GPS receivers having a common time reference with two antennas to derive the phase differences between GPS carrier phase as received by the antennas. The phase differences and knowledge of the GPS satellite positions as determined by their ephemerides and time can then be used with INS pitch and roll to determine vehicle heading. Because of the periodicity of the carrier phase, ambiguities arise and various methods have been devised to resolve them. The need for two receivers entails an undesirable cost penalty, especially when used with a low-cost INS.

SUMMARY OF THE INVENTION

The integrated GPS/inertial navigation apparatus is for use with two spatially-separated antennas on a mobile platform, the two antennas being capable of receiving signals from one or more satellites. Each satellite signal comprises one or more component signals with each component signal having a different carrier frequency. The integrated GPS/inertial navigation apparatus consists of a receiver and an inertial navigation system.

The receiver measures the carrier phase of each of one or more component signals of one or more satellite signals received by each of the two antennas during successive time periods of duration $T_p$. Phase measured during a $T_p$ time period is called $T_p$-phase. Only one component signal of one satellite signal received by one antenna is measured during any single time period. The receiver utilizes the $T_p$-phases of each component signal obtained during a $T_k$ time period to estimate the phase of the component signal at the end of the $T_k$ time period, the estimated phase at the end of the $T_k$ time period being called the $T_k$-phase.

The inertial navigation system, comprising inertial sensors and a digital processor, utilizes the $T_k$-phases in determining the heading of the vehicle. The inertial navigation system also utilize the $T_k$-phases in determining the displacement of each of the two antennas from the inertial sensors of the inertial navigation system. The measured phase of a component signal is subject to error as a result of the satellite signal traversing the ionosphere. The inertial navigation system achieves more accurate estimates of heading and antenna displacements by utilizing the $T_k$-phases in determining the ionospheric corrections.

BRIEF DESCRIPTION OF THE DRAWINGS

FIG. 1 is a block diagram of the invention.

DESCRIPTION OF THE PREFERRED EMBODIMENTS

The preferred embodiment of the invention is shown in FIG. 1 and consists of two antennas 1 and 3, a switched-channel GPS receiver 5 and an inertial navigation system (INS) 7. The two spatially-separated omnidirectional antennas 1 and 3 are designed to receive the GPS navigation signals transmitted by the GPS satellites at frequencies L1 (1575.42 MHz) and L2 (1227.6 MHz).

The antennas are mounted on a platform in such a way that the projections of the phase centers of the two antennas onto a nominally level plane are at least one meter apart. This separation could be achieved on an aircraft, for example, by either mounting the antennas along the top of the fuselage or on one or both of the wings. On a land or sea vehicle, any part of the structure could be used as long as the one-meter separation of the projection of the antenna locations to a nominally horizontal plane is provided with a reasonably unobstructed view of the sky. The antennas need not physically be in a nominally horizontal plane, however. One may be higher than the other.

The antennas should be attached to ground planes to maintain good control of the phase centers of the antennas at all viewing angles to the satellites. Reflections received from other parts of the vehicle should also be minimized for optimum performance.

The navigation signals received by antenna 1 feed into RF channels 9 and 11, and those received by antenna 3 feed into RF channels 13 and 15. RF channels 9 and 13 pass only the L1 signal component while RF channels 11 and 15 pass only the L2 signal component. The outputs of the four RF channels feed into the switch 17.

The single output of the switch 17 feeds into a down-converter 19 which translates the frequency of the input signal, under the control signal appearing on conductor 21, to a fixed IF. The output of the down converter 19 feeds into the signal digitizer 23.

The signal digitizer 23 samples in-phase and quadrature components of the input signal at twice the code chipping rate and supplies these in-phase and quadrature digitized samples to the receiver processor 25 which performs a number of functions among which is the estimation of carrier phase.

The down-converter 19, the signal digitizer 23, and the receiver processor 25 (insofar as the basic functions required for deriving navigation information, including the estimation of pseudorange, delta pseudorange, and carrier phase) are described in greater detail in U.S. Pat. No. 4,807,256 which is hereby incorporated by reference.

The receiver processor 25, by means of a control signal on line 27, causes the switch 17 to periodically and repetitively sequence its four input signals to its output thereby obtaining pseudorange, delta pseudorange, and carrier phase for the four combinations of antenna and frequency during each repetition cycle. Pseudorange $R_p$ is defined by the equation $$R_p = R + c(\Delta t - \Delta T) + \Delta R_{ion} + \Delta R_{trop} \qquad (1)$$

where R is the actual range from the antenna to the satellite, c is the propagation speed of the radio waves in vacuum, $\Delta t$ is the satellite clock error, $\Delta T$ is the user clock error, $\Delta R_{ion}$ and $\Delta R_{trop}$ are ionospheric and tropospheric corrections which account for the difference in propagation speed of radio waves through the ionosphere and troposphere respectively as compared to a vacuum.

Delta pseudorange is the change in pseudorange over a specified time interval and is equal to the time rate of change of actual range adjusted for the difference in satellite clock rate error and user clock rate error and is equivalent to the measured Doppler shift in the carrier frequency of the received satellite signal.

Carrier phase $\Phi$ is defined by the equation $$\Phi = R + c(\Delta t - \Delta T) - N\lambda + \Delta R_{ion} + \Delta R_{trop} \qquad (2)$$

where $\lambda$ is the radio-wave wavelength and N is an integer such that $\Phi$ is constrained to a one-wavelength range.

The Kalman filter 29 located in the inertial navigation system 7 supplies to the receiver processor 25 computed user clock error and user clock rate error. The receiver processor 25 adds the computed user clock error to its estimates of pseudorange and carrier phase and adds the computed user clock rate error to its estimates of delta pseudorange to obtain user clock adjusted (UCA) estimates. These UCA pseudoranges, delta pseudoranges, and carrier phases are supplied by the receiver processor 25 to the Kalman filter 29.

The receiver processor 25 extracts satellite ephemeris data, satellite clock and clock rate errors, and synchronization data from the satellite signals and supplies this data to range processor 31 in the inertial navigation system 7.

The inertial measurement unit (IMU) 33, a Litton LN-200 model, supplies to navigation processor 35 in the inertial navigation system 7 platform acceleration measured by accelerometers fixed to the platform and platform angular rotation rate measured by gyros also fixed to the platform. This data is corrected by the navigation processor 35 for accelerometer and gyro bias, scale factor error, and misalignment using data supplied by the Kalman filter 29.

A barometric altimeter 37 provides a platform altitude input to navigation processor 35. Corrections for altimeter bias and scale factor errors are supplied to the navigation processor 35 by the Kalman filter 29.

The navigation processor 35 uses the platform acceleration, angular rotation rate, and altitude to periodically compute the position, velocity, and attitude of the platform. These quantities are corrected with data supplied by the Kalman filter 29, and the corrected data is passed on to the range processor 31.

The range processor 31 uses this corrected data together with antenna displacements (corrected in accordance with the antenna displacement errors supplied by the Kalman filter 29) and the satellite ephemeris data to obtain computed ranges, delta ranges, and carrier phases. The range processor 31 adds the satellite clock error, the ionospheric correction, and the tropospheric correction to each computed range thereby obtaining a quantity analogous to the UCA pseudorange supplied to the Kalman filter 29 by the receiver processor 25.

The ionospheric correction is determined from an equation involving an ionospheric parameter (the error in the ionospheric parameter being determined by the Kalman filter 29 and supplied to the range processor). The tropospheric correction is computed by the range processor 31 from the ephemeris data and the location of the user's vehicle.

The range processor 31 also adds satellite clock rate error to each computed delta range thereby obtaining a quantity analogous to the UCA delta pseudorange supplied by the receiver processor 25 to the Kalman filter 29. The range processor 31 also subtracts $N\lambda$ from each UCA pseudorange analog to obtain a quantity analogous to UCA carrier phase. These computed UCA pseudorange analogs, computed UCA delta range analogs, and computed UCA carrier phase analogs are supplied to the Kalman filter 29.

The determination of N can be accomplished in any one of a number of ways. Examples are given by Knight in U.S. Pat. No. 5,296,861, by Ward et al. in U.S. Pat. No. 5,185,610, and by Hatch in U.S. Pat. No. 5,072,227.

The Kalman filter 29 obtains a minimal mean-square-error solution of the navigation problem and supplies corrections to the input data in anticipation of the next iteration of the Kalman process. The Kalman process is well-known and will not be described here since it is described in detail in a number of textbooks, one example being A. Gelb, ed., *Applied Optimal Estimation*, The Analytical Sciences Corporation, The M.I.T. Press, Cambridge, Mass., 1974.

The vehicle states used by the Kalman filter 29 number 42 and consist of two level position states, one heading state, three velocity states, three attitude states, one altitude state, three accelerometer bias states, three accelerometer scale factor states, six accelerometer misalignment states, three gyro bias states, three gyro scale factor states, three gyro misalignment states, one barometric altimeter bias state, one barometric altimeter scale factor state, one user clock phase state, one user clock frequency state, one ionospheric parameter state, and six antenna displacement states.

The time $T_k$ typically required to execute a Kalman filter iteration is several seconds. The switching cycle for the switch 17 in FIG. 1 may be as long $4T_k$, in which case the receiver processor 25 provides an estimate of the carrier phase for one frequency and one antenna coincident with the beginning of a Kalman filter iteration. The receiver processor 25 may produce carrier phase estimates at $T_p$ intervals where $T_p$ may be as short as a millisecond, in which case the carrier phase estimate for a particular frequency and for a particular antenna produced at the beginning of each $T_k$ interval would be calculated using all of the carrier phase estimates for the particular frequency and for the particular antenna obtained during the prior $T_k$ interval. However, only one new carrier phase estimate for each frequency and for each antenna would enter the Kalman filter process during each iteration. The procedure for determining the phase at the end of a time period using phase measurements obtained during the time interval is a straightforward and well-understood statistical procedure and is described in many textbooks.

The switching cycle for the switch 17 may be as short as $4T_p$, in which case the receiver processor 25 would provide four carrier phase estimates at the beginning of each $T_k$ interval. The receiver processor 25 would calculate the carrier phase estimate for a particular frequency and a particular antenna delivered at the beginning of a $T_k$ interval using all of the phase estimates corresponding to the same frequency and the same antenna obtained during the prior $T_k$ interval.

The switching cycle can of course range anywhere between $4T_p$ and $4T_k$.

The preferred embodiment is a system in which the switching cycle results in the selection of signals of frequency L1 and L2 from each of the two antennas. In another embodiment, the switching cycle would cycle between two antennas with the signal frequency always being either L1 or L2, in which case ionospheric parameter state would be omitted from the Kalman filter states. Similarly, the switching cycle might alternate between the two frequencies with the antenna being always the same, in which case the Kalman filter process estimation of the vehicle heading would not benefit from the measurement of carrier phases of signals received at spatially separated antennas. However, errors in the ionospheric parameter could still be estimated utilizing the Kalman filter process.

The preferred embodiment shown in FIG. 1 shows a receiver processor 25, a navigation processor 35, a range processor 31, and a Kalman filter 29. An alternative preferred embodiment would utilize a single digital processor to perform the functions of these four processors.

What is claimed is:

1. Apparatus for use with two antennas on a mobile platform, the two antennas being capable of receiving signals from one or more satellites, each satellite signal comprising one or more component signals, each component signal having a different carrier frequency, the apparatus comprising:

a receiver which obtains satellite ephemeris data and measures the carrier phase of each of one or more component signals of one or more satellite signals received from one or more satellites by each of the two antennas during successive time periods of duration $T_p$, phase measured during a $T_p$ time period being called $T_p$-phase, only one component signal of one satellite signal received by one antenna being measured during any single $T_p$ time period, the receiver utilizing the $T_p$-phases of each component signal obtained during a $T_k$ time period by each antenna to estimate the phase of the component signal at the end of the $T_k$ time period, the estimated phase at the end of the $T_k$ time period being called the $T_k$-phase, $T_k$ being equal to or greater than $T_p$;

an inertial navigation system comprising inertial sensors and a digital processor, the inertial navigation system utilizing measurements of platform acceleration and platform angular rotation rate in determining the positions of the two antennas and the heading of the platform, the inertial navigation system utilizing the satellite ephemeris data and the positions of the two antennas to obtain computed ranges from the two antennas to the satellites, the inertial navigation system utilizing the computed ranges and the $T_k$-phases in determining the error in the heading of the vehicle.

2. The apparatus of claim 1 wherein the nominal displacements of the two antennas from the inertial sensors are predetermined, the inertial navigation system utilizing the $T_k$-phases in determining the error in the displacement of each of the two antennas from the inertial sensors of the inertial navigation system.

3. The apparatus of claim 1 wherein the inertial navigation system utilizes the $T_k$-phases in determining the ionospheric corrections.

4. The apparatus of claim 1 wherein the inertial navigation system obtains estimates of navigation quantities including heading by utilizing a Kalman filter process, the time when new $T_k$-phases become available coinciding with the beginning of a Kalman filter iteration.

5. The apparatus of claim 1 wherein the inertial navigation system obtains estimates of navigation quantities including heading by utilizing a Kalman filter process, the new $T_k$-phases becoming available with the beginning of each Kalman filter iteration.

6. The apparatus of claim 1 wherein, the inertial navigation system obtains estimates of navigation quantities including heading by utilizing a Kalman filter process, one new $T_k$-phase becoming available with the beginning of each Kalman filter iteration.

7. The apparatus of claim 1 wherein the receiver comprises:

a component signal selector having a plurality of input ports, an output port, and a control input port, at least one of the input ports being connected to one antenna, the other input ports being connected to the other antenna, a control signal at the control input port causing the input ports to be successively connected to the output port for time periods $T_p$, the signal component selector causing a signal component of the signal entering the input port connected to the output port to be translated in frequency from an RF to an IF;

a processor having a signal input port, a control output port, and a data output port, the signal input port being connected to the output port of the signal component selector, the control output port being connected to the control input port of the component signal selector, the control signal being supplied to the component signal selector by the processor through the control output port, the data output port being connected to the inertial navigation system, the processor measuring the $T_p$-phase of the component signal entering the input port during each $T_p$ time period and computing the $T_k$-phase for each component signal entering the input port during each $T_k$ time period, the $T_k$-phases being supplied to the inertial navigation system through the data output port.

8. A method for determining the heading of a vehicle utilizing inertial sensors and at least one satellite signal, each satellite signal comprising one or more component signals, each component signal having a different carrier frequency, the method comprising the steps:

(a) obtaining satellite ephemeris data and measuring during successive time periods of duration $T_p$ the phase of each of one or more component signals of one or more satellite signals received from one or more satellites at first and second predetermined points on the vehicle, the phase of only one component signal being measured during any $T_p$ time period, a phase measured during a $T_p$ time period being called a $T_p$-phase;

(b) computing the phase of each component signal of each satellite signal received at each of the first and second predetermined points at the end of a $T_k$ time period utilizing the $T_p$-phases for that component signal measured during the $T_k$ time period, the computed phase of a component signal at the end of a $T_k$ time period being called a $T_k$-phase;

(c) utilizing measurements of platform acceleration and platform angular rotation rate referenced to a third predetermined point on the vehicle in determining the positions of the first and second predetermined points and the heading of the vehicle and then utilizing satellite ephemeris data and the positions of the first and second predetermined points to compute ranges from the first and second predetermined points to the one or more satellites at the end of a $T_k$ time period;

(d) determining the error in vehicle heading at the end of a $T_k$ time period utilizing the measurements and computations made in steps (a), (b), and (c);

(e) repeating steps (a), (b), (c), and (d) indefinitely.

9. The method of claim 8 wherein the nominal displacements of the first and second predetermined points from the third predetermined point are predetermined, the method further comprising the step:

(f) determining the errors in the displacements of the first and second predetermined points from the third predetermined point at the end of a $T_k$ time period utilizing the measurements and computations made in steps (a), (b), and (c), step (f) being performed at the same time as step (d).

10. The method of claim 8 further comprising the step:

(g) determining the ionospheric corrections to the phases at the end of the $T_k$ time period utilizing measurements, computations, and determinations made in steps (a), (b), and (c), the step (g) being performed at the same time as step (d).

* * * * *